US011962607B2

(12) United States Patent
Corron et al.

(10) Patent No.: US 11,962,607 B2
(45) Date of Patent: Apr. 16, 2024

(54) WEB PAGE RISK ANALYSIS USING MACHINE LEARNING

(71) Applicant: Capital One Services, LLC, McLean, VA (US)

(72) Inventors: Lauren Corron, Vienna, VA (US); Jonathan Blocksom, Reston, VA (US); Kelly Jo Brown, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 411 days.

(21) Appl. No.: 17/314,697

(22) Filed: May 7, 2021

(65) Prior Publication Data

US 2022/0360599 A1 Nov. 10, 2022

(51) Int. Cl.
*H04L 29/06* (2006.01)
*H04L 9/40* (2022.01)

(52) U.S. Cl.
CPC ...... *H04L 63/1425* (2013.01); *H04L 63/1483* (2013.01)

(58) Field of Classification Search
None
See application file for complete search history.

(56) References Cited

U.S. PATENT DOCUMENTS

| 10,880,322 | B1 * | 12/2020 | Jakobsson | H04L 51/08 |
|---|---|---|---|---|
| 2006/0253458 | A1 * | 11/2006 | Dixon | H04L 63/1483 |
| 2012/0036580 | A1 * | 2/2012 | Gorny | H04L 63/101 |
| | | | | 726/25 |
| 2014/0136613 | A1 * | 5/2014 | Chandar | G06Q 50/01 |
| | | | | 709/204 |
| 2014/0237595 | A1 * | 8/2014 | Sridhara | G06F 21/566 |
| | | | | 709/224 |
| 2015/0348042 | A1 * | 12/2015 | Jivraj | G06Q 20/326 |
| | | | | 705/44 |
| 2017/0078315 | A1 * | 3/2017 | Allen | H04L 63/1433 |

(Continued)

OTHER PUBLICATIONS

Oct. 5, 2020, Bannister, The Daily Swig, Sharkcop: Google Chrome Extension Uses Machine Learning to Detect Phishing URLs, <<https://portswigger.net/daily-swig/sharkcop-google-chrome-extension-uses-machine-learning-to-detect-phishing-urls>>, 5 pages, printed May 6, 2021.

(Continued)

*Primary Examiner* — Benjamin E Lanier
(74) *Attorney, Agent, or Firm* — Banner & Witcoff, Ltd.

(57) ABSTRACT

Methods, systems, and apparatuses for risk analysis of web pages using a machine learning model are described herein. A computing device may receive a risk detection machine learning model trained to receive input corresponding to a web page and output an indication of risk associated with the web page. The computing device may execute a web browser application and collect user activity data by monitoring user activity associated with the web browser application. The computing device may access, via the web browser application, a first web page, and collect page data associated with the first web page. The computing device may calculate a risk level of the first web page. The risk level may be calculated by processing, using the risk detection machine learning model, both the user activity data and the page data. A security recommendation may be output based on the risk level.

20 Claims, 4 Drawing Sheets

(56) References Cited

U.S. PATENT DOCUMENTS

2021/0377303 A1* 12/2021 Bui .................. G06F 40/14

OTHER PUBLICATIONS

Sep. 7, 2019, van Bergen, et al., What is Mixed Content?, 8 pages, https://web.dev/what-is-mixed-content/>>, printed May 6, 2021.
Lawrence, Avoiding the Not Secure Warning in Chrome, Web, Google Developers, 5 pages, <https://developers.google.com/web/updates/2016/10/avoid-not-secure-warn>>, printed May 6, 2021.
May 23, 2018, Keizer, How your web browser tells you when it's safe, 7 pages, <<https://www.computerworld.com/article/3275726/how-your-web-browser-tells-you-when-its-safe.html>>, printed May 6, 2021.
How to force your site to redirect to https (SSL), Dream Host Knowledge Base, 5 pages, <<https://help.dreamhost com/hc/en-us/articles/115003505112-How-to-force-your-site-to-redirect-to-https-SSL>>, printed May 6, 2021.

* cited by examiner

WEB PAGE RISK ANALYSIS USING MACHINE LEARNING

FIELD OF USE

Aspects of the disclosure relate generally to web page risk analysis. More specifically, aspects of the disclosure may provide for enhanced web page risk analysis using trained machine learning algorithms trained to consider, e.g., user activity.

BACKGROUND

Internet-based scams are almost as old as the Internet itself. Those scams often rely on tricking users into accessing certain web pages and, for example, providing payment information (e.g., credit card numbers) or log-in information (e.g., for a bank account, video game account, or the like), which is later used for unauthorized purposes. Such scams generally rely on tricking users to provide payment and/or log-in information under false pretenses. For example, web pages used in effecting Internet scams may, in many instances, appear legitimate (e.g., and may use the branding and overall design of a legitimate web page), but may in fact be designed to steal funds and/or accounts from users.

While modern Internet users are often quite savvy and can readily detect lazier Internet scams, modern Internet scams have evolved to evade such detection. Internet scams are now much better hidden, much more subtle, and much more complex than they were in the past. As such, even advanced users might be uncertain as to whether or not a particular web page is legitimate or not. Though some modern web browsers purport to make preliminary checks as to web page authenticity (by, e.g., alerting users when a web page does not use certain protocols, has been tagged in a database as a scam, or the like), those preliminary checks are often insufficient for helping users avoid more nuanced scams. As such, even the most savvy Internet users are sometimes tricked into providing information to scam web pages.

Aspects described herein may address these and other problems, and generally improve the quality, efficiency, and speed of web page risk analysis systems by offering improved analysis of pages using a machine learning algorithm which processes on, among other data points, user activity and page data.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for evaluating the risk of a web page using a risk detection machine learning algorithm. This may have the effect of improving the security of users of the Internet by detecting, in a significantly more nuanced and responsive way, potential web page-based scams. According to some aspects, these and other benefits may be achieved by using a risk detection machine learning model, trained to receive input corresponding to a web page and user activity and output an indication of risk associated with the web page, to process user activity data associated with a web browser application and/or page data associated with a web page.

More particularly, some aspects described herein may provide a computer-implemented method for risk analysis of web pages. The method may comprise receiving, by a computing device and from a remote server, a risk detection machine learning model trained to receive input corresponding to a web page and output an indication of risk associated with the web page. As will be described in further detail below, such a model may be implemented as part of a web browser application plug-in. The computing device may then execute a web browser application. The computing device may collect user activity data by monitoring user activity associated with the web browser application. This user activity data may comprise, for example, web pages previously browsed by the user and/or other applications executing on the computing device. The computing device may then access, via the web browser application, a first web page. It might not be known at the time whether the first web page is valid or a possible scam. As such, the computing device may collect page data associated with the first web page. The computing device may then calculate, using the risk detection machine learning model, a risk level of the first web page by processing both the user activity data and the page data. The computing device may then cause output, based on the risk level, of a security recommendation.

According to some embodiments, the computing device may query, based on the page data, the remote server to identify a merchant associated with the web page, and may calculate the risk level based on an identity of the merchant. The page data may comprise one or more words displayed by the page, and the computing device may calculate the risk level based on determining that at least one of the one or more words are misspelled and/or based on determining that at least one of the one or more words is associated with urgency. The user activity data may comprise a recent browsing history of a user of the web browser application, and the computing device may calculate the risk level based on one or more web pages previously accessed by the web browser application. The user activity data may comprise an indication of one or more applications, different from the web browser application, executing on the computing device, and the computing device may calculate the risk level based on an identity of the one or more applications. The computing device may additionally and/or alternatively receive, from the remote server, updated weights for the risk detection machine learning model, and the computing device may then apply, before accessing the first web page, the weights to the risk detection machine learning model. Executing the web browser application may comprise configuring the risk detection machine learning model as part of a browser extension for the web browser application, such that the browser extension is configured to cause the risk detection machine learning model to process web pages accessed via the web browser application. The computing device may cause output of the security recommendation by causing, based on the risk level, generation of a temporary credit card number and causing output of the temporary credit card number for use with the first web page. The temporary credit card number may be limited, by the computing device and based on the risk level, such that the temporary credit card number is limited to a maximum number of uses, the temporary credit card number is only valid during a time period, and/or the temporary credit card number is limited to a maximum payment amount.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
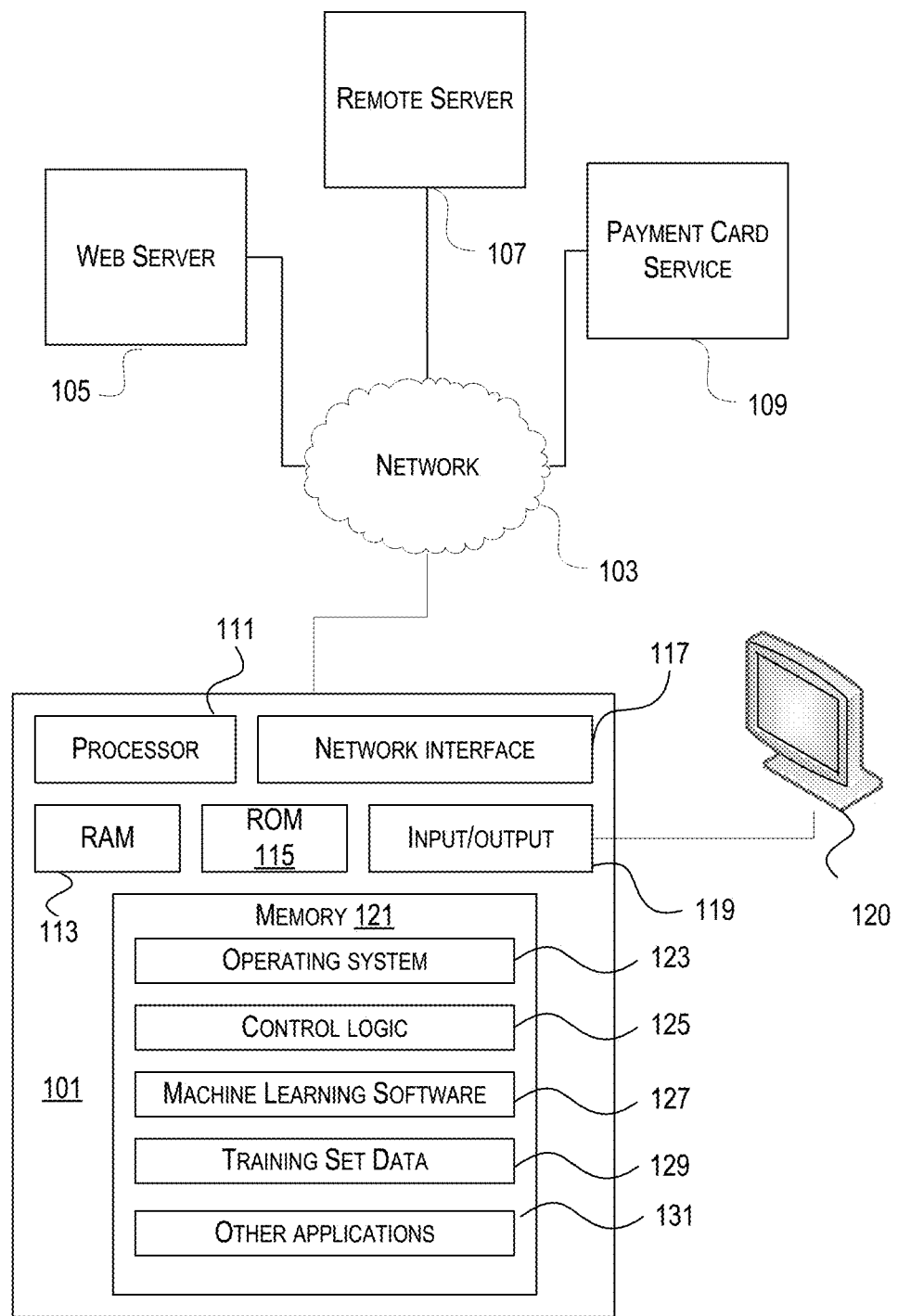
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for analyzing and addressing the risk of web pages. As discussed further herein, this combination of features may allow users to, using computing devices, browse the Internet safely and operate safely when accessing potentially fraudulent web pages. As a simple example, the features discussed herein may allow users to identify web page-implemented scams and, in certain circumstances, when use of a temporary credit card number would be advisable.

Aspects described herein may improve the functioning of computers by improving the way in which computing devices present and handle potentially risky web pages. Web page-implemented scams are far from new, but even modern web browsers may struggle to detect and protect users from rudimentary scams. This is partially because scammers regularly revise their scam web pages to avoid simplistic web browser-based scam checks. That said, protecting users from such scams is critical: web page-implemented scams can be used to pilfer users' payment card information (e.g., to steal and fraudulently use a credit card) or log-in information (e.g., to log-in and access private content about a user). The aspects described herein implement an evolving, nuanced, and significantly more comprehensive manner of detecting and addressing such scams. For example, use of a machine learning model to detect scam web pages allows the computing device to identify new scam web pages, even if those web pages have not been reviewed by a security researcher. As another example, by using a machine learning model to determine a risk level and using that risk level to determine whether a temporary credit card number should be used, the overall safety of Internet-enabled financial transactions may be improved. As such, the aspects described herein make significant steps to improving the overall security of computing devices, with a particular focus on a certain type of web page scam effectuated over the Internet.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes (e.g., the computing device 101, a web server 105, a remote server 107, and/or a payment card service 109) may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. The computing device 101, the web server 105, the remote server 107, the payment card service 109, and/or other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here. The other applications 131 may comprise, for example, a web browser application configured to access one or more web pages.

The web server 105, the remote server 107, the payment card service 109, and/or other devices (not shown) may have similar or different architecture as described with respect to computing device 101. Those of skill in the art will appreciate that the functionality of computing device 101 (or web server 105, the remote server 107, and/or the payment card service 109) as described herein may be spread across multiple data processing devices, for example, to distribute processing load across multiple computers, to segregate transactions based on geographic location, user access level, quality of service (QoS), etc. For example, the computing device 101, the web server 105, the remote server 107, the payment card service 109, and/or other devices (not shown) may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method for the analysis of risk of web pages.

Figure 2:
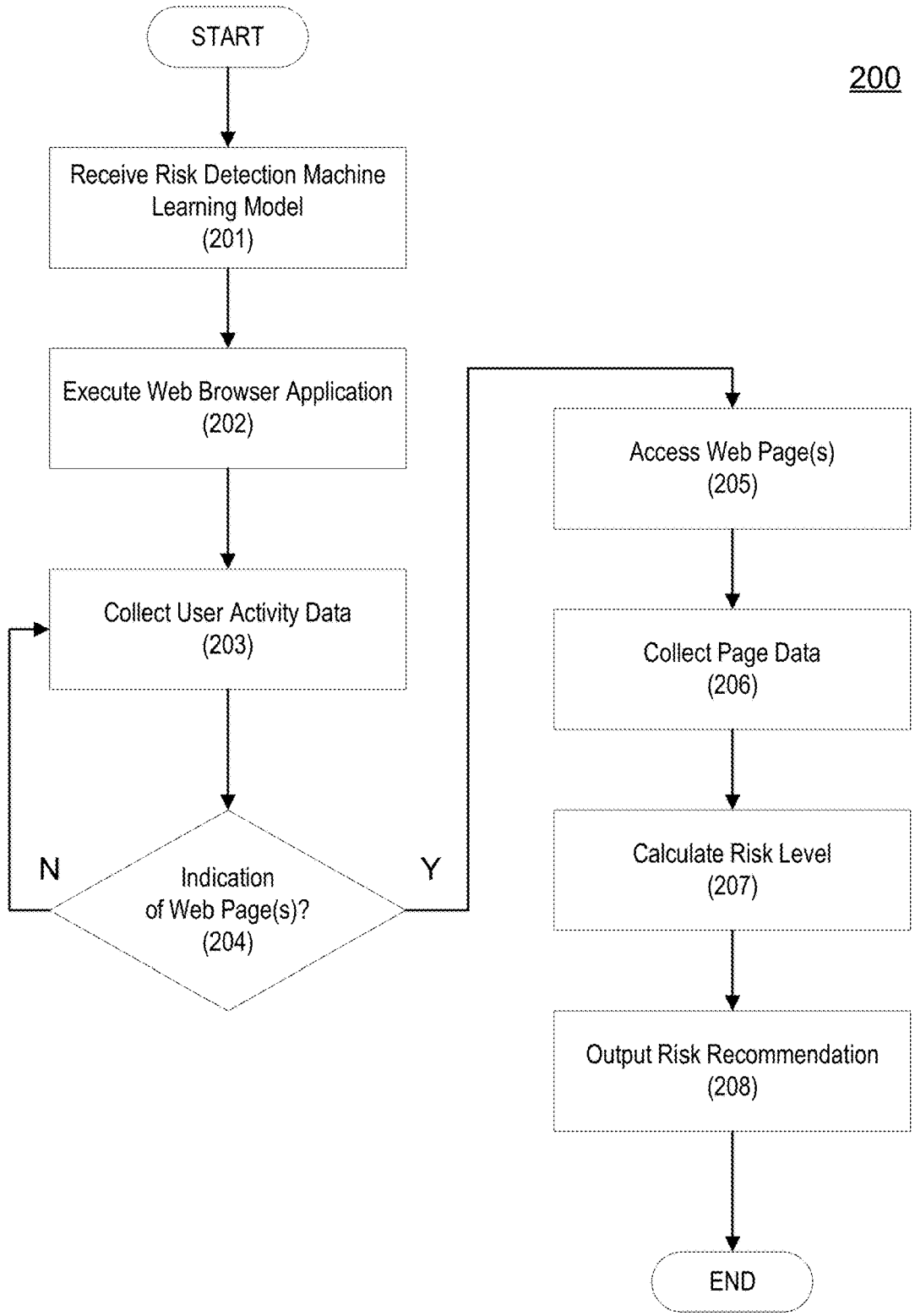
FIG. 2 depicts a flow chart for a method of analyzing web page risk using a risk detection machine learning model.

FIG. 2 illustrates an example method 200 for analyzing the risk of web pages in accordance with one or more aspects described herein. The method 200 may be implemented by a suitable computing system, as described further herein. For example, the method 200 may be implemented by any suitable computing environment by a computing device and/or combination of computing devices, such as the computing device 101, the web server 105, the remote server 107, and/or the payment card service 109 of FIG. 1. The method 200 may be implemented in suitable program instructions, such as in machine learning software 127, and may operate on a suitable training set, such as training set data 129.

In step 201, a computing device may receive a risk detection machine learning model. The risk detection machine learning model may be part of the machine learning software 127, as described in FIG. 1. The risk detection machine learning model may be received over a network, such as the network 103. The risk detection machine learning model need not be received in any particular format. For example, the risk detection machine learning model may be received as part of a web browser application plug-in, such as may be executed alongside the web browser application. As another example, the risk detection machine learning model may be received as a series of weighted values to be applied to an existing machine learning model already present on the computing device.

The risk detection machine learning model may be trained to receive input corresponding to a web page. Input corresponding to a web page may be any data relating to access to a web page, activity by a user relating to a web page, or the like. As will be described further below, the input may comprise user activity data, such as other web pages recently browsed by the user, applications (e.g., other than the web browser application) currently executing on the computing device, inputs made by a user (e.g., a movement of a mouse, locations touched on a touchscreen), or the like. As will also be described further below, the input may comprise page data, such as web page metadata, one or more words present on a web page, an encoding level of a web page, a domain name of a location of a web page, or the like. The risk detection machine learning model may have been trained using training data, such as the training set data 129. For example, the training data may comprise a variety of different sets of page data, some tagged as being associated with a scam, others tagged as not being associated with a scam. As another example, the training data may comprise a variety of different sets of user activity data, some tagged as being associated with a user being tricked into accessing a scam web page, others tagged as being ordinary user activity.

The risk detection machine learning model may be trained to output, based on input, an indication of risk associated with a web page. An indication of risk associated with a web page may be any indication of whether a web page is risky and/or associated with a scam. For example, the indication of risk may be a Boolean value indicating whether the web page is a scam, may be a confidence value (e.g., from zero to one-hundred percent) relating to how strongly a web page is predicted to be a scam, or the like. It may be advantageous for the indication of risk to be one of a range of values, such that it may be compared to a threshold. For example, if the indication of risk is a value from zero to one-hundred, then a threshold of seventy five may be established such that pages with an indication of risk equal to or greater than seventy five are considered to be scams.

The risk detection machine learning model may be periodically updated. For example, the computing device may periodically receive updated weights for the risk detection machine learning model, then apply those weights to the risk detection machine learning model. In this manner, updates to the risk detection machine learning model (e.g., to reflect new types of scams, new understandings of how web pages might be legitimate or related to scams) might be propagated to various computing devices. For example, the computing device may receive, from a remote server (e.g., the remote server 107), updated weights for the risk detection machine learning model, and then apply, before accessing the first web page, the weights to the risk detection machine learning model.

In step 202, the computing device may execute a web browser application. A web browser application may be any application which may access one or more web pages. The web browser application may additionally and/or alternatively be configured to receive and use browser plug-ins (also known as a browser extension). Such browser plug-ins/extension may execute along with the web browser application. For example, the risk detection machine learning model may be part of a web browser plug-in. In this manner, the risk detection machine learning model might readily access and determine risk levels for web pages accessed by a web browser application. For example, this may comprise configuring the risk detection machine learning model as part of a browser extension for the web browser application such that the browser extension is configured to cause the risk detection machine learning model to process web pages accessed via the web browser application.

In step 203, the computing device may collect user activity data. User activity data may comprise any information about use, by a user, of the computing device. The user activity data may comprise input information. For example, the user activity data may indicate mouse moments made by a user, locations touched on a touchscreen, or the like. The user activity data may additionally and/or alternatively comprise a recent browsing history of a user of the web browser application. For example, the user activity data may comprise a listing of one or more web pages accessed by the user over a period of time. The user activity data may additionally and/or alternatively comprise an indication of one or more applications, different from the web browser application, executing on the computing device. For example, the user activity data may indicate that the computing device is executing, in addition to the web browser application, an e-mail client, a media client, or the like.

In step 204, the computing device may determine whether it has received an indication of one or more web pages. The indication of the one or more web pages may be part of a user browsing the Internet, such as clicking on a link (e.g., in the web browser application or another application), opening the web browser application to a default home page, receiving a Uniform Resource Locator (URL) from a different computing device and/or application, or the like. If the indication of the one or more web pages is received, the method 200 may proceed to step 205. Otherwise, the method 200 may return to step 203.

In step 205, the computing device may access the one or more web pages indicated in step 204. Accessing the one or more web pages may comprise querying one or more servers, such as the web server 105, based on the indication of the one or more web pages. For example, if the indication of the one or more web pages comprises a URL, then the computing device may cause the URL to be accessed by a web browser application. The particular manner in which a web page is accessed might vary based on, for example, the particularities of the web browser application, the protocol used to access the web page, and the like.

In step 206, the computing device may collect page data. The page data may comprise any information about a web page, such as the web pages accessed in step 205. The page data may comprise web page metadata. For example, the page data may comprise a page title, page encoding data, one or more categories and/or tags of a web page, design properties of the web page (e.g., use of Cascading Style Sheets (CSS)), or the like. The page data may additionally and/or alternatively comprise one or more words of the web page. For example, the page data may comprise all or a subset of words used in the web page. Such words need not be in English, and may be one or more characters (e.g., Japanese characters) used to represent concepts. More broadly, such words may comprise non-grammatical characters, such as emoji. As will be described further below, this may be useful to detect words commonly used in scams, such as words indicating urgency, misspelled words, or the like.

The page data may be transmitted to a remote server (e.g., the remote server 107). In this manner, the remote server may use the page data to make updates to the risk detection machine learning model. For example, the remote server may use page data received from a plurality of different computing devices to further train the risk detection machine learning model. Such page data may be tagged, by the computing device or the remote server, based on outcomes. For example, if it is later determined that a web page is a scam (by, for example, a user being scammed), then the page data corresponding to that web page may be tagged as a scam and used as additional training data. The page data may be used by the remote server to generate an update to the risk detection machine learning model, as described above. For example, the computing device may transmit, to the remote server, the page data, and receive, from the remote server, an update to the risk detection machine learning model that is based on the page data.

In step 207, the computing device may calculate a risk level. The risk level may be calculated using the risk detection machine learning model. The risk level may correspond to the one or more web pages accessed in step 205. The risk level may indicate an estimate of a likelihood that the one or more pages are associated with a scam. For example, the risk level may be a value, from zero to one-hundred, indicating a likelihood that the one or more web pages correspond to a scam.

The risk level may be calculated by processing the user activity data. The user activity data may indicate whether a web page is potentially a scam in a variety of ways. For example, if a user accessed a web page by clicking a link in an e-mail, the likelihood of the web page of being a scam is somewhat more likely than if the user manually entered a URL into the address field of a web browser. As another example, if the user is particularly distracted by other applications, then the likelihood that the user might inadvertently click their way into a scam web page is somewhat higher. As yet another example, monitoring user input might indicate whether a user was tricked into a clickjacking scam, where the user was tricked into clicking an unintended hyperlink on a previous web page.

The risk level may be calculated by processing the page data. The page data may indicate whether a web page is potentially a scam in a variety of ways. The page data may comprise one or more words associated with urgency, which might indicate that a web page is a scam. This is particularly the case for scams that try to trick users into quickly logging in and/or paying for a product without thoughtfully considering Internet safety. The page data may comprise one or more misspelled words, which might indicate that a web page is a scam. For example, some pages might use intentionally misspelled words that do not appear to be misspelled, such as replacing a lower case "L" with a "l" to evade certain types of scam detection.

The risk level may be based on an identity of a merchant associated with a web page. An external organization, such as one managing the payment card service 109, may maintain a database indicating merchants and corresponding web pages where users may initiate payments to those merchants. As part of calculating the risk level, the computing device may query a remote server (e.g., the payment card service 109 and/or the remote server 107) to identify a merchant associated with one or more web pages. The risk level may then be based on the identity of the merchant. In this manner, merchants associated with a higher level of fraudulent transactions might be associated with a higher risk level, whereas merchants associated with a lower level of fraudulent transactions might be associated with a lower risk level.

In step 208, the computing device may output a risk recommendation. A risk recommendation may be output configured to warn a user regarding whether a web page appears to be a scam. For example, the output may be a green check mark if a web page appears to be legitimate, whereas the output may be a red stop sign if a web page appears to be associated with a scam. The output may be configured to prevent a user from interacting with a web page. For example, the output may be a pop-up that, until interacted with, prevents a user from accessing content of the web page.

Outputting the risk recommendation may comprise causing output of a temporary credit card number. A temporary credit card number may be a valid credit card number that is limited in any variety of ways (e.g., limited to a maximum number of uses, to a valid time period, and/or to a maximum payment amount) to protect a user. With a temporary credit card number, a user may pay for a good or service without using their real credit card, protecting them from credit card theft. For example, by providing a temporary credit card number for a subscription service, a customer may be able to limit the subscription service to billing only while the temporary credit card number is valid. Outputting the temporary credit card number may be based on the risk level. For instance, the temporary credit card number may be output based on a determination that the risk level satisfies a threshold. As such, causing output of the security recommendation may comprise, for example, causing, based on the risk level, generation of a temporary credit card number, and then causing output of the temporary credit card number for use with the first web page.

When outputting a temporary credit card number, the temporary credit card number may be limited based on the risk level. For example, based on the risk level, the temporary credit card number may be limited such that the temporary credit card number is limited to a maximum number of uses. This maximum number of uses might be, for example, only a single use, such that a user cannot be tricked into inadvertently signing up for a subscription service. As another example, based on the risk level, the temporary credit card number may be limited such that the temporary credit card number is only valid during a time period. This time period may be based on words of urgency in the web page, such that the temporary credit card number might be valid only for a time period indicated on the web page. As yet another example, based on the risk level, the temporary credit card number may be limited such that the temporary credit card number is limited to a maximum payment amount. Such a maximum payment amount may be based on a value found in the page data such that, for example, the user can pay no more than the amount indicated on the web page.

Discussion will now turn to how a risk detection machine learning model may be trained and transmitted to computing devices. For instance, discussion will now focus on steps which may be performed by the remote server 107 as part of training the risk detection machine learning model and transmitting it to devices such as the computing device 101.

Figure 3:
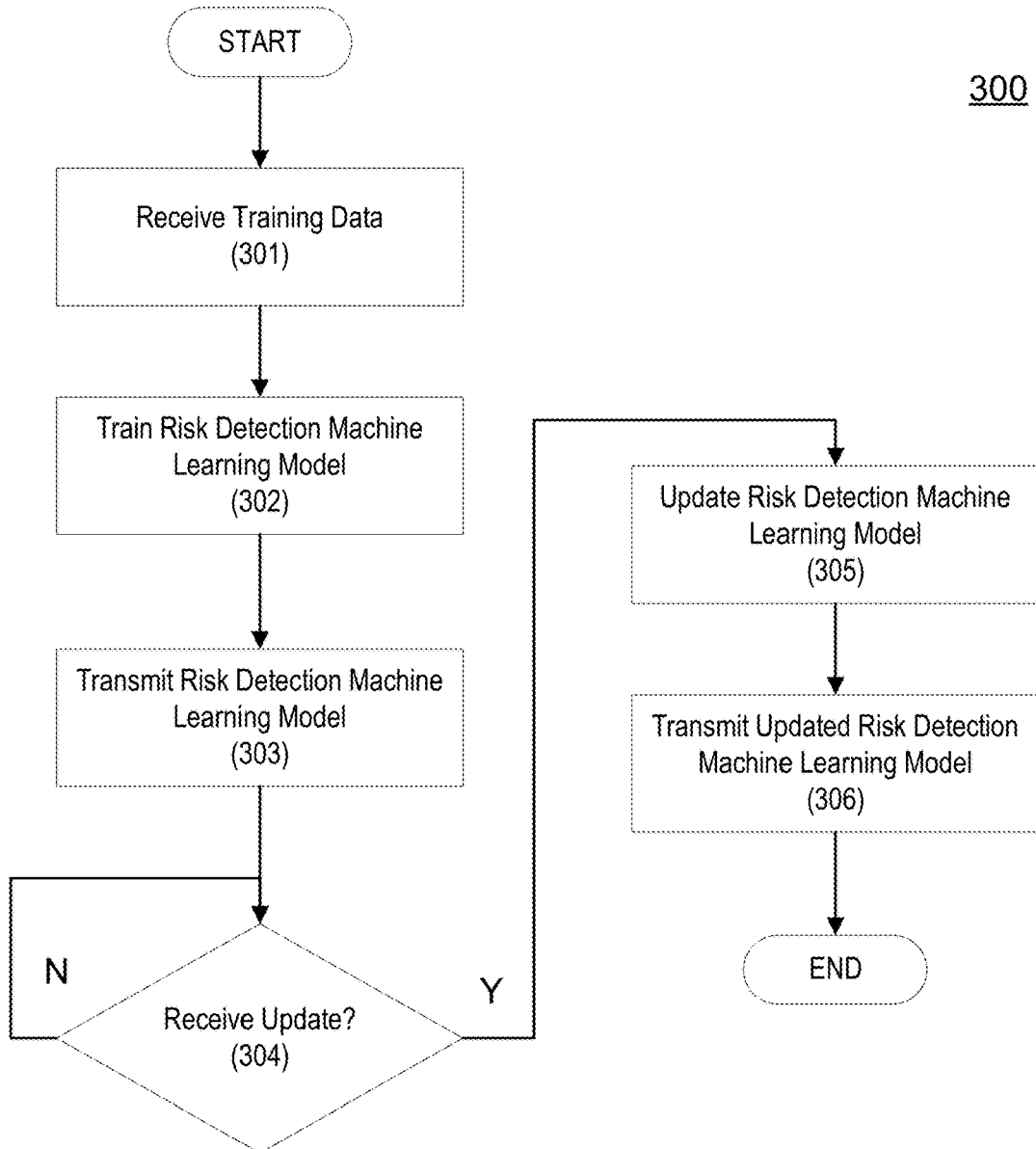
FIG. 3 depicts a flow chart for a method of training a risk detection machine learning model.

FIG. 3 illustrates an example method 300 for training and deploying a risk detection machine learning model for analyzing the risk of web pages in accordance with one or more aspects described herein. The method 300 may be implemented by a suitable computing system, as described further herein. For example, the method 300 may be implemented by any suitable computing environment by a computing device and/or combination of computing devices, such as the computing device 101, the web server 105, the remote server 107, and/or the payment card service 109 of FIG. 1.

In step 301, a remote server may receive training data. The training data may be the same or similar as the training set data 129. The training data may be received from one or more external sources, and/or may be manually entered by an administrator. The training data may comprise one or more sets of data (e.g., sets of user activity data, sets of page data), tagged or untagged, which may be used to train the risk detection machine learning model. For example, the training data may comprise a plurality of sets of user activity data. Such sets may be tagged (e.g., by an administrator) based on whether the user activity data indicates user activity that would make a user vulnerable to a scam. As another example, the training data may comprise a plurality of sets of page data. Such sets may be tagged (e.g., by an administrator) based on whether the page data corresponds to a web page-implemented scam. As yet another example, the training data may comprise indications of merchants. Such sets may be tagged (e.g., by an administrator) based on whether the merchant is affiliated with potential fraud or not.

In step 302, the remote server may train the risk detection machine learning model based on the received training data. Training the risk detection machine learning model may be performed in any manner appropriate to the model in question. For example, machine learning software may be executed on a wide plurality of nodes, such that training the risk detection machine learning model may comprise providing, to an input node, the received training data.

In step 303, the remote server may transmit the risk detection machine learning model to a computing device. For example, the remote server 107 may transmit, via the network 103, the risk detection machine learning model to the computing device 101 as a web browser application plug-in. As another example, the remote server 107 may transmit, via the network 103, the risk detection machine learning model to the computing device 101 as a series of weights to implement in machine learning software executing on the computing device 101.

In step 304, the remote server may determine whether it has received an update for the risk detection machine learning model. The update may comprise, for example, new training data, such as one or more new sets of user activity data or page data. The update may comprise an indication of an accuracy of the machine learning model, such as data indicating that the machine learning model has incorrectly tagged a legitimate web page as a scam. Such updates may come from a computing device, such as the computing device 101, and may be received as part of a web browser application plug-in executing on the computing device 101. For example, responsive to the output described in step 208 of FIG. 2, a user may provide an indication of whether the output from the risk detection machine learning model was correct (e.g., an indication that a web page tagged as a scam was in fact legitimate), and such an indication may be used to correct or otherwise tweak the risk detection machine learning model. If an update is received, the method 300 may proceed to step 305. As indicated by the negative arrow looping with respect to step 304, if an update is not received in step 304, then the remote server may continue to wait for an update. In such a circumstance, step 303 may be repeated, such as the originally-trained risk detection machine learning model may be transmitted.

In step 305, the remote server may update the risk detection machine learning model based on the update received in step 304. The process of updating the risk detection machine learning model may be the same or similar as the process of training the risk detection machine learning model in step 302. In this way, the risk detection machine learning model may be continually trained over time using new data.

In step 306, the remote server may transmit the updated risk detection machine learning model. Transmitting the updated risk detection machine learning model need not comprise transmitting the entirety of the updated risk detection machine learning model. For example, the remote server 107 may transmit, to the computing device 101, a series of updated weights for application on the risk detection machine learning model already implemented on the computing device 101.

Discussion will now turn to ways in which the risk detection machine learning model may be structured to learn from training data and to provide output comprising risk levels.

Figure 4:
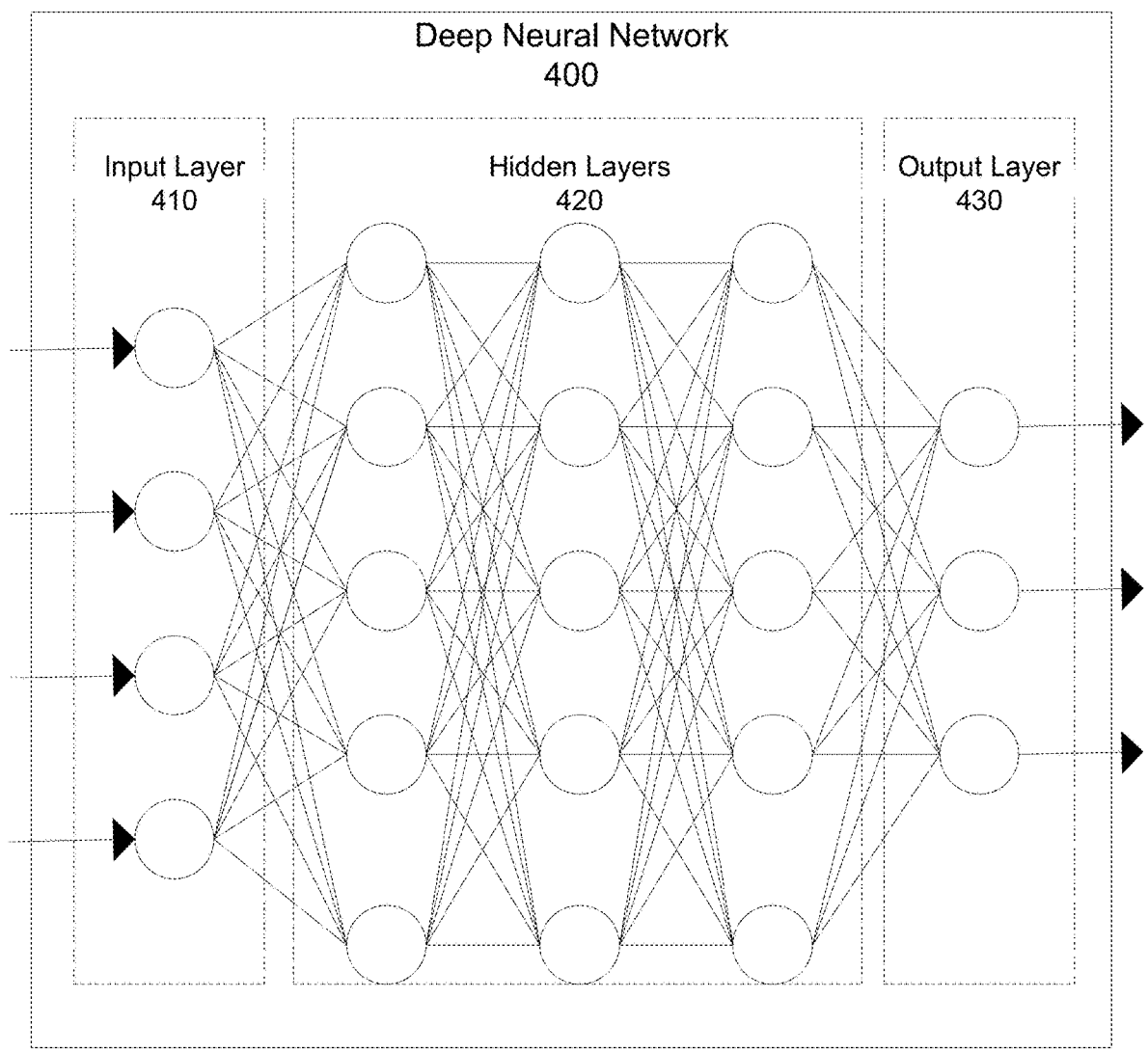
FIG. 4 depicts an example artificial neural network which may be used to implement a risk detection machine learning model.

FIG. 4 illustrates an example deep neural network architecture 400, which may be used to implement the risk detection machine learning model described herein. An artificial neural network, such as the deep neural network architecture 400, may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. For example, as already discussed above, the risk detection machine learning model may be provided training data which trains the risk detection machine learning model to determine a risk level corresponding to a web page.

An artificial neural network may have an input layer 410, one or more hidden layers 420, and an output layer 430. A deep neural network, as used herein, may be an artificial network that has more than one hidden layer. Illustrated network architecture 400 is depicted with three hidden layers, and thus may be considered a deep neural network. The number of hidden layers employed in deep neural network 400 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model. As described above with respect to step 306 of FIG. 3, such weights might be transmitted as part of an update to the risk detection machine learning model.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, by a computing device and from a remote server, a risk detection machine learning model trained to receive user input data associated with a web page and output an indication of risk associated with the web page;
executing, by the computing device, a web browser application comprising a risk detection web browser plugin configured to implement the risk detection machine learning model;
collecting user activity data that indicates a plurality of different applications executing on the computing device by:
detecting the plurality of different applications, other than the web browser application, executing on the computing device;
accessing, via the web browser application, a first web page;
collecting, via the risk detection web browser plugin, page data associated with the first web page, wherein the page data comprises one or more words displayed by the web page;
calculating, using the risk detection machine learning model, a risk level of the first web page by processing the user activity data that indicates the plurality of different applications executing on the computing device;
querying, based on the page data, the remote server to identify a merchant associated with the web page; and
causing output, by the computing device, based on the risk level, based on a quantity of fraudulent transactions associated with the merchant, and based on the one or more words of the page data, of a security recommendation.

2. The method of claim 1, wherein at least one of the plurality of different applications comprises an e-mail client application.

3. The method of claim 1, wherein causing output of the security recommendation is based on determining that at least one of the one or more words are misspelled.

4. The method of claim 1, wherein causing output of the security recommendation is based on determining that at least one of the one or more words is associated with urgency.

5. The method of claim 1, wherein the user activity data further comprises a recent browsing history of a user of the web browser application.

6. The method of claim 1, wherein the user activity data comprises an indication of one or more applications, different from the web browser application, executing on the computing device, and wherein calculating the risk level is based on an identity of the one or more applications.

7. The method of claim 1, further comprising:
receiving, by the computing device and from the remote server, updated weights for the risk detection machine learning model; and applying, before accessing the first web page, the weights to the risk detection machine learning model.

8. The method of claim 1, wherein the risk detection web browser plugin is configured to cause the risk detection machine learning model to determine a risk level for each web page accessed via the web browser application.

9. The method of claim 1, wherein causing output of the security recommendation comprises:
causing, based on the risk level, generation of a temporary credit card number; and
causing output of the temporary credit card number for use with the first web page.

10. The method of claim 9, further comprising:
limiting, based on the risk level, the temporary credit card number such that:
the temporary credit card number is limited to a maximum number of uses;
the temporary credit card number is only valid during a time period; or
the temporary credit card number is limited to a maximum payment amount.

11. The method of claim 1, further comprising:
transmitting, to the remote server, the page data; and
receiving, from the remote server, an update to the risk detection machine learning model, wherein the update is based on the page data.

12. An apparatus comprising:
one or more processors; and
memory storing instructions that, when executed by the one or more processors, cause the apparatus to:
receive, from a remote server, a risk detection machine learning model trained to receive user input data associated with a web page and output an indication of risk associated with the web page;
execute a web browser application comprising a risk detection web browser plugin configured to implement the risk detection machine learning model;
collect user activity data that indicates a plurality of different applications executing on the apparatus by:
detecting the plurality of different applications, other than the web browser application, executing on the apparatus;
access, via the web browser application, a first web page;
collect, via the risk detection web browser plugin, page data associated with the first web page, wherein the page data comprises one or more words displayed by the web page;
query, based on the page data, the remote server to identify a merchant associated with the web page;
calculate, using the risk detection machine learning model, a risk level of the first web page by processing;
the user activity data that indicates the plurality of different applications executing on the apparatus, and
a quantity of fraudulent transactions associated with the merchant;
cause, based on the risk level satisfying a threshold and based on the one or more words of the page data, generation of a temporary credit card number; and
cause output of the temporary credit card number for use with the first web page.

13. The apparatus of claim 12, wherein the remote server comprises a database of merchants and corresponding web pages where users may initiate payments to those merchants.

14. The apparatus of claim 12, wherein the instructions, when executed by the one or more processors, cause the apparatus to cause generation of the temporary credit card number based on determining that at least one of the one or more words are misspelled.

15. The apparatus of claim 12, wherein the instructions, when executed by the one or more processors, cause the apparatus to cause generation of the temporary credit card number based on determining that at least one of the one or more words is associated with urgency.

16. The apparatus of claim 12, wherein the instructions, when executed by the one or more processors, cause the apparatus to:
receive, from the remote server, updated weights for the risk detection machine learning model; and
apply, before accessing the first web page, the weights to the risk detection machine learning model.

17. The apparatus of claim 12, wherein the instructions, when executed by the one or more processors, cause the apparatus to execute the web browser application by causing the apparatus to:
cause, via the risk detection web browser plugin, the risk detection machine learning model to determine a risk level for each web page accessed via the web browser application.

18. One or more non-transitory computer-readable storage media having computer-executable instructions stored thereon that, when executed by one or more processors, cause a computing device to perform steps comprising:
receiving, by the computing device and from a remote server, a risk detection machine learning model trained to receive user input data associated with a web page and output an indication of risk associated with the web page;
executing, by the computing device, a web browser application comprising a risk detection web browser plugin configured to implement the risk detection machine learning model;
collecting user activity data that indicates a plurality of different applications executing on the computing device by:
detecting the plurality of different applications, other than the web browser application, executing on the computing device;
accessing, via the web browser application, a first web page;
collecting, via the risk detection web browser plugin, page data associated with the first web page, wherein the page data comprises one or more words displayed by the web page;
querying, based on the page data, the remote server to identify a merchant associated with the web page;
calculating a risk level of the first web page by processing, by the computing device and using the risk detection machine learning model;
the user activity data that indicates the plurality of different applications executing on the computing device, and
a quantity of fraudulent transactions associated with the merchant;
causing, based on the risk level satisfying a threshold and based on the one or more words of the page data, generation of a temporary credit card number; and
causing output of the temporary credit card number for use with the first web page.

19. The non-transitory computer-readable storage media of claim 18, wherein the instructions, when executed by one or more processors, further cause the computing device to perform steps comprising:
    limiting, based on the risk level, the temporary credit card number such that:
        the temporary credit card number is limited to a maximum number of uses;
        the temporary credit card number is only valid during a time period; or
        the temporary credit card number is limited to a maximum payment amount.

20. The non-transitory computer-readable storage media of claim 18, wherein the instructions, when executed by one or more processors, further cause the computing device to perform steps comprising:
    receive, from the remote server, updated weights for the risk detection machine learning model; and
    apply, before accessing the first web page, the weights to the risk detection machine learning model.

\* \* \* \* \*